US010384164B2

(12) United States Patent
Iyer

(10) Patent No.: US 10,384,164 B2
(45) Date of Patent: Aug. 20, 2019

(54) COMBINED ELECTRICAL AND THERMAL RENEWABLE/CONVENTIONAL ENERGY STORAGE AND ON-DEMAND HYDRO-OSMOTIC POWER GENERATION METHODS AND SYSTEMS

(71) Applicant: NRGTEK, Inc., Orange, CA (US)

(72) Inventor: Subramanian Iyer, Orange, CA (US)

(73) Assignee: NRGTEK, Inc., Orange, CA (US)

( * ) Notice: Subject to any disclaimer, the term of this patent is extended or adjusted under 35 U.S.C. 154(b) by 67 days.

(21) Appl. No.: 15/791,365

(22) Filed: Oct. 23, 2017

(65) Prior Publication Data

US 2018/0128250 A1    May 10, 2018

Related U.S. Application Data

(60) Provisional application No. 62/417,864, filed on Nov. 4, 2016.

(51) Int. Cl.
| | | |
|---|---|---|
| *C02F 1/44* | (2006.01) | |
| *F03G 7/00* | (2006.01) | |

(Continued)

(52) U.S. Cl.
CPC ....... *B01D 61/005* (2013.01); *B01D 17/0205* (2013.01); *B01D 19/0005* (2013.01);
(Continued)

(58) Field of Classification Search
None
See application file for complete search history.

(56) References Cited

U.S. PATENT DOCUMENTS

| | | | | |
|---|---|---|---|---|
| 7,914,680 B2* | 3/2011 | Cath | ............ | B01D 61/002 |
| | | | | 203/10 |
| 8,259,766 B2* | 9/2012 | Naito | ............ | H01S 5/06213 |
| | | | | 372/38.02 |

(Continued)

FOREIGN PATENT DOCUMENTS

WO    2015068160 A1    5/2015

OTHER PUBLICATIONS

PCT Form ISA237, Written Opinion, PCT/US2017/044903 (dated Oct. 18, 2017).

(Continued)

*Primary Examiner* — Krishnan S Menon
(74) *Attorney, Agent, or Firm* — UltimatEdge IP Law Group, P.C.; Dean G. Stathakis; Vito A. Canuso, III

(57) ABSTRACT

In one embodiment, a renewable energy generation and storage system and method is provided for storing both electrical and thermal energy that includes a forward osmosis system for drawing water across a membrane such that the water drawn across the membrane is used to dilute an osmotic ionic draw solution and the diluted osmotic ionic draw solution is used to drive a hydro-turbine; an FO-EED separation system for separating the drawn water from the ionic draw solution using renewable electrical energy and an osmotic polymer introduced in the FO-EED system during use, so that the ionic draw solution is re-concentrated by using electrical energy, such that the water from the ionic solution combines with the concentrated osmotic polymer; a coalescer configured to receive compressed $CO_2$ to separate the water from the polymer by having the polymer absorb the compressed $CO_2$ during use; and using thermal energy for separating the $CO_2$ from the polymer, thereby regenerating a concentrated polymer solution.

14 Claims, 1 Drawing Sheet

(51) Int. Cl.

| | |
|---|---|
| *H02K 7/18* | (2006.01) |
| *B01D 17/02* | (2006.01) |
| *B01D 19/00* | (2006.01) |
| *B01D 61/00* | (2006.01) |
| *B01D 61/42* | (2006.01) |
| *B01D 61/58* | (2006.01) |
| *C02F 103/08* | (2006.01) |

(52) U.S. Cl.
CPC ....... *B01D 19/0036* (2013.01); *B01D 61/002* (2013.01); *B01D 61/58* (2013.01); *C02F 1/445* (2013.01); *F03G 7/005* (2013.01); *H02K 7/1823* (2013.01); *B01D 61/422* (2013.01); *B01D 2311/25* (2013.01); *B01D 2311/2684* (2013.01); *B01D 2313/36* (2013.01); *B01D 2313/38* (2013.01); *C02F 2103/08* (2013.01); *C02F 2201/009* (2013.01); *C02F 2303/10* (2013.01); *C02F 2303/16* (2013.01); *Y02W 10/33* (2015.05); *Y02W 10/37* (2015.05)

(56) References Cited

U.S. PATENT DOCUMENTS

| | | | |
|---|---|---|---|
| 8,702,846 B2 | 4/2014 | Menzel | |
| 8,795,525 B2* | 8/2014 | McGinnis | F03G 7/005 203/DIG. 1 |
| 9,044,711 B2* | 6/2015 | McGinnis | B01D 3/145 |
| 9,216,917 B2 | 12/2015 | Carmignani et al. | |
| 9,266,065 B2 | 2/2016 | McGinnis et al. | |
| 9,540,255 B2 | 1/2017 | Kang et al. | |
| 10,233,089 B2* | 3/2019 | Novek | C01C 1/26 |
| 2009/0294366 A1 | 12/2009 | Wright et al. | |
| 2010/0155329 A1 | 6/2010 | Iyer | |
| 2010/0212319 A1 | 8/2010 | Donovan | |
| 2010/0313752 A1 | 12/2010 | Powell et al. | |
| 2011/0186441 A1 | 8/2011 | LaFrancois et al. | |
| 2012/0060686 A1 | 3/2012 | Kortunov et al. | |
| 2012/0171095 A1 | 7/2012 | O'Brian et al. | |
| 2013/0139695 A1 | 6/2013 | Chang et al. | |
| 2015/0122727 A1 | 5/2015 | Kamik et al. | |
| 2015/0273396 A1 | 10/2015 | Hancock et al. | |
| 2016/0046360 A1 | 2/2016 | Kim et al. | |
| 2016/0167974 A1 | 6/2016 | Novek | |
| 2018/0128250 A1 | 5/2018 | Iyer | |
| 2019/0070560 A1 | 3/2019 | Kennedy et al. | |

OTHER PUBLICATIONS

USPTO Non-Final Office Action, U.S. Appl. No. 15/271,175 (dated Aug. 10, 2017).

USPTO Non-Final Office Action, U.S. Appl. No. 15/272,406 (dated Jan. 25, 2018).

Yang, et al., Efficient SO2 Capture by Amine Functionalized PEG, Phys. Chem. Chem. Phys. 15: 18123-18127 (2013).

Zhu, Lewis-Base Polymers for Modifying Absorption and Desorption Abilities of Silica Supported, Amine Based Solid Carbon Dioxide Capture Materials, M.S. Thesis, University of Missouri-Columbia (Dec. 2014).

USPTO Non-Final Office Action, U.S. Appl. No. 15/784,700 (dated Apr. 19, 2019).

\* cited by examiner

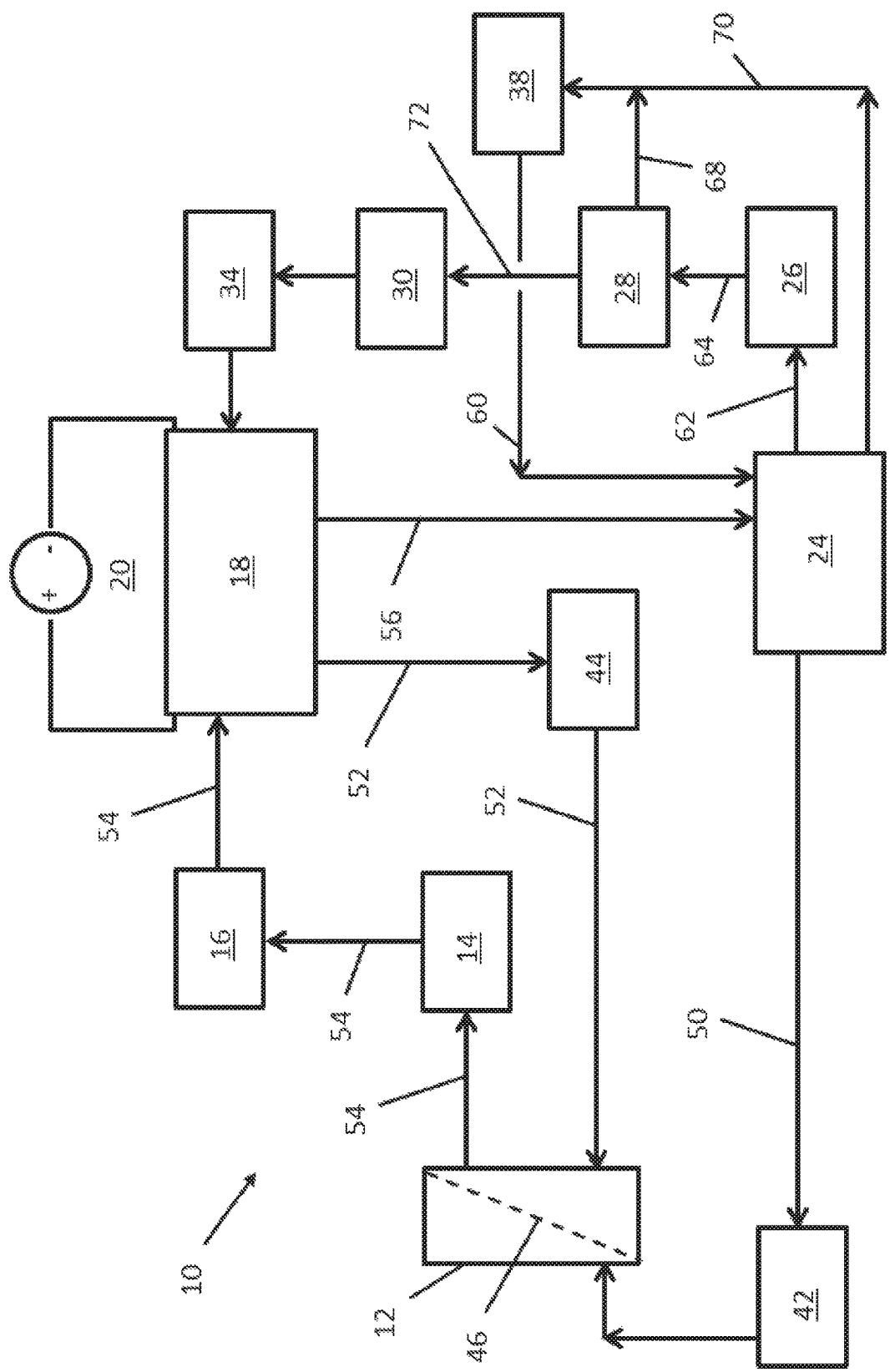

COMBINED ELECTRICAL AND THERMAL RENEWABLE/CONVENTIONAL ENERGY STORAGE AND ON-DEMAND HYDRO-OSMOTIC POWER GENERATION METHODS AND SYSTEMS

CORRESPONDING PATENT APPLICATION

The present application claims priority from Provisional patent application Ser. No. 62/417,864, filed Nov. 4, 2016, the entire contents of which is incorporated by reference.

BACKGROUND

Forward osmosis (FO) is a technology currently being explored for desalination of seawater. Unlike reverse osmosis (RO) processes, which employ high pressures ranging from 400-1100 psi to drive fresh water through a membrane, forward osmosis uses the natural osmotic pressures of salt or polymer solutions, called 'draw solutions', to effect fresh water separation. A draw solution having a significantly higher osmotic pressure than the saline feed-water, flows along the permeate side of the FO membrane, and water naturally transports itself across the membrane by osmosis. Osmotic driving forces in FO can be significantly greater than hydraulic driving forces in RO, leading to higher water flux rates and recoveries. Thus, it is a low-pressure system, allowing design with lighter, compact, less expensive materials. These factors translate in considerable savings, both in capital and operational costs.

Joint research by Yale University and Oasys Inc, under an Office of Naval Research grant, compared forward osmosis to reverse osmosis processes, and found superior performance and flux rates. Based on these studies, Oasys developed a forward osmosis process using ammonium bicarbonate aqueous solutions as the draw down liquids. Other FO processes have been proposed, using either magnesium chloride draw solutions, polymeric draw solutions based on polyethylene glycols, volatile solutes like dimethyl amines, sulfur dioxide or aliphatic alcohols, or bivalent/precipitable salts like aluminum sulfate/calcium hydroxide (Modern Water, UK). Glucose or sucrose have been used as solutes for the draw solution, which can then be ingested after suitable dilution (Hydration Technologies International Inc). Polymeric draw solutions have also been developed based on polyethylene glycols (PEGs) and polypropylene glycols (PPGs).

Solutions of magnesium chloride, ammonium chloride, calcium chloride in water, and polymers like PEG/PPG solutions in water generate very high osmotic pressures, in the range of 300-400 atm, based on their concentration. The ionic salts mentioned above, as well as sodium and potassium bicarbonates, also do not decompose or scale at the temperatures contemplated herein, while the water in the salt solution can be substantially boiled off by the application of low-temperature waste heat, thus regenerating the concentrated salt solutions needed for hydro-osmotic power generation. The preferred draw solute for this application would be the ionic chlorides of magnesium or calcium, due to their very high osmotic potentials at a concentration of 2.5M to 3.0M, as well as the minimized scaling of these salts at steam temperatures. The use of these salts also enables the temperature in the boiler/heat exchanger to be higher, called the Top Brine Temperature (TBT) to around 125-150° C., which increases the efficiency of the boiler. However, the main drawback in the use of these concentrated ionic solutions is the need to boil off and recover the water of dilution, since the latent heat of vaporization of water is around 970 Btu/lb of water to be removed, a substantial energy penalty.

Similarly, polymeric draw solutions also generate very high osmotic potentials, and are also not volatile, with very high boiling points ($\approx 230°$ C.), suitable for power generation from low-temperature waste heat. A polyethylene glycol (PEG) solution generates very high osmotic pressures for its solutions in water, depending on its concentration. Thus, a 95% solution in water of PEG 400 at 20° C. has a calculated osmotic pressure of 658 atm; for PEG 600, it is 977 atm; for PEG 2000, it is 2,540 atm.

Polyethylene glycols (PEGs), polymers of ethylene glycol (EG), have been used in industry to produce very high osmotic pressures, in the order of tens of atmospheres. In comparison, seawater (3.5% NaCl) has an osmotic pressure of only 28 atms at 25° C. PEGs are hypotonic by nature, and absorb water exceedingly well. The hydrogen bonding between water molecules and the electron-rich ether oxygen in the EO (ethylene oxide) monomer enables almost 2.5-3.0 molecules of water to be coordinated with each EO monomer, leading to high osmotic pressures. Thus, the greater the number of EO monomers in the PEG molecule, the greater the osmotic pressure exhibited.

While the PEGs used in these copolymers are linear in structure, and increase in melting point and viscosity as the chain-length increases, there are other forms of PEGs available, with different geometries, that are termed branched or multi-armed PEGs. Branched PEGs have 3-10 PEG chains emanating from a central core group. Star PEGS have 10 to 100 PEG chains emanating from a central core group, while comb PEGs have multiple PEG chains grafted onto a polymer backbone. Such branched PEGs allow more EO groups in the polymer, while remaining in the liquid state and having lower melting points and viscosity than comparable linear PEGs with the same number of EO monomers. Thus, the use of such PEG geometries can enable higher water absorption, while retaining the practicality of using higher number of EO monomers for water molecule interaction by hydrogen bonding, leading to high osmotic pressures. An additional property of these branched PEG polymers, as described in co-pending U.S. patent application Ser. No. 15/271,175, filed Sep. 20, 2016, and Ser. No. 15/272,406, filed Sep. 21, 2016, the entire contents of each of which are incorporated herein by reference, is also the ability to phase-separate from water by suitable amine-termination of the branched ends of these polymers and subsequent absorption of carbon dioxide.

Suitably engineered polymers enable high flux rates against fresh water across the FO modules, while efficiently phase-separating at temperatures associated with low-temperature heat ($\approx 75-95°$ C.), without inordinately large heat transfer surfaces. Some such polymers would be block or random branched co-polymers of ethoxylate-propoxylates like sorbitol ethoxylate-propoxylates, sorbitan ethoxylate-propoxylates, glycerol ethoxylate-propoxylates, trimethylolpropane ethoxylate-propoxylates, pentaerithritol ethoxylate-propoxylates, glucose and sucrose ethoxylate-propoxylates, other poly-hydric polymers, and similar branched derivatives of these ethoxylate-propoxylate co-polymers.

Modification of these polymer derivatives by amine-termination enables them to undergo phase-separation from water, or inverse solubility in water, by absorption of $CO_2$, as described in co-pending U.S. patent application Ser. No. 15/271,175, filed Sep. 20, 2016, and Ser. No. 15/272,406, filed Sep. 21, 2016, the entire contents of each of which are incorporated herein by reference. Use of such polymers, with their high osmotic pressures, and their property of inverse solubility with water by $CO_2$ absorption, can be used for hydro-osmotic power generation.

A great quantity of energy can be potentially obtained when waters of different salinities are mixed together. The harnessing of this energy for conversion into hydro-osmotic power can be accomplished by means of a technology called Pressure Retarded Forward Osmosis (PRFO). This technique uses a semi-permeable membrane to separate a less concentrated solution, or solvent, (for example, fresh water) from a more concentrated and pressurized solution (for example an osmotic draw agent), allowing the water to pass to the concentrated solution side. The difference in osmotic potential between two solutions, separated by a semi-permeable membrane, yields a pressure differential, which is similar to the effect of gravity in creating potential energy (static head) for conversion to hydroelectric energy. Normal hydropower plants use the static head of water in dams to yield energy when the water is allowed to run through turbine generators. Similarly, osmotic pressure differentials can also be used to drive hydro-turbine generators to create energy. The additional fluid volume due to the permeation of water increases the pressure on the permeate side, which is depressurized in a hydro-turbine to produce power—thus the term 'hydro-osmotic power'.

SUMMARY

Embodiments of a renewable energy generation and storage system are provided, wherein in one embodiment, the system comprises: a forward osmosis system for drawing water across a membrane such that, when in use, the water drawn across the membrane is used to dilute an osmotic concentrated ionic draw solution and the increased volume of the diluted osmotic draw solution is used to drive a hydro-turbine to produce energy; a hydro-turbine driven by the diluted draw solution when in use; an FO-EED separation system for separating the drawn water from the ionic draw solution using renewable electrical energy while simultaneously diluting an osmotic polymer introduced in the FO-EED system during use, so that the ionic draw solution can be re-directed to the forward osmosis system and the water combined with the introduced polymer for further processing during use; and a coalescer configured to receive compressed $CO_2$ to separate the water from the polymer by having the polymer absorb the compressed $CO_2$ during use. In one embodiment, the renewable energy generation and storage system further comprises a source of heat to facilitate separation of the $CO_2$ from the polymer. In one embodiment, the draw solution comprises one or more ionic osmotic solutions, which may comprise magnesium chloride and/or ammonia chloride. In one embodiment, the osmotic polymer comprises one or more amine-terminated branched polyethylene glycols. In one embodiment, power from solar photovoltaic or wind turbines is used to supply electrical energy for the FO-EED system. In one embodiment, the source of heat comprises solar thermal heat.

In applications of embodiments of the present invention, a method of generating and storing renewable energy is provided, where in one application the method comprises: drawing water across a forward osmosis membrane in a forward osmosis system such that the water drawn across the membrane dilutes an osmotic ionic draw solution; directing the diluted osmotic ionic draw solution to drive a hydro-turbine to produce energy; separating the water from the ionic draw solution using an osmotic polymer so that the ionic draw solution can be re-directed to the forward osmosis system and the resulting combined water and polymer can be further processed; and separating the therein diluted osmotic polymer from the water using compressed $CO_2$. In one application, separating the water from the ionic draw solution comprises directing the diluted ionic draw solution into an FO-EED module. In one application, the method of generating and storing renewable thermal energy further comprises heating the combination of polymer and $CO_2$ to facilitate separation of the $CO_2$ from the polymer. In one application, the draw solution comprises one or more ionic osmotic solutions, which may comprise magnesium chloride and/or ammonia chloride. In one application, the osmotic polymer comprises one or more amine-terminated branched polyethylene glycols. In one application, heating comprises directing the combination of polymer and $CO_2$ through a solar thermal heat exchanger.

The use of concentrated ionic salt solutions or the above-mentioned engineered polymers are useful for hydro-osmotic power generation for electrical energy storage or thermal energy storage in separate systems, as described in co-pending U.S. patent application Ser. No. 15/784,700 filed Oct. 16, 2017, the entire contents of which is incorporated herein by reference. Embodiments of the present invention integrate both modes of energy, electrical and thermal, into a single system, capable of storing both forms of energy, from renewable or non-renewable sources, for use in power generation as desired. Embodiments of the present invention also use technology described in co-pending U.S. patent application Ser. No. 15/153,688, filed May 12, 2016 and U.S. patent application Ser. No. 15/665,732, filed Aug. 1, 2017, both of which are incorporated in their entirety herein by reference, to convert both ionic and polymeric solutions to concentrated solutions, and store electrical and thermal energy as concentrated ionic and polymeric draw solutions, for hydro-osmotic power generation when needed.

BRIEF DESCRIPTION OF THE FIGURES

The aforementioned objects and advantages of the present invention, as well as additional objects and advantages thereof, will be more fully understood hereinafter as a result of a detailed description of a preferred embodiment when taken in conjunction with the following drawings in which:

FIG. 1 shows a schematic view of one embodiment of the present invention.

DETAILED DESCRIPTION OF CERTAIN EMBODIMENTS

A cost-effective energy storage technology, at low cost kWh cycle, and capable of rapid ramp-up, and combined with large scale installations of renewable energy, is needed to equalize grid loads throughout the day, for residential, commercial and utility-scale customers. The cost/kWh/cycle metric includes device costs, balance of system (BOS) costs, round trip efficiency (RTE) rates, long-term maintenance requirements, current rates, and the number of cycles that the device can store and discharge electricity, etc.

Forward osmosis (FO) reflects recent technology being explored for desalination of seawater and produced water from oil and gas fields. Unlike reverse osmosis (RO) processes, which employ high pressures ranging from 400-1100 psi to drive fresh water through the membrane, forward osmosis uses the natural osmotic pressures of salt solutions to effect fresh water separation. A draw solution, having a significantly higher osmotic pressure than the saline feed-water, flows along the permeate side of the membrane, and water naturally transports itself across the membrane by osmosis. FO also does not require extensive pretreatment, given that the low pressures minimize fouling of the membranes. Relevant FO technology is described more fully in U.S. Pat. No. 8,021,553, issued Sep. 20, 2011 and assigned to NRGTEK, the entire contents of which is incorporated herein by reference. Relevant FO technology is also described in Non-Provisional patent application Ser. No. 15/153,688, filed May 12, 2016, and Non-Provisional patent application Ser. No. 15/272,406, filed Sep. 21, 2016, the entire contents of both of which is incorporated herein by reference.

Electro-electrodialysis (EED) is a technology developed for obtaining concentrated ionic solutions from dilute ionic solutions, using single cells in a parallel configuration, which enables more precision in voltage and amperage control across each cell, as compared to a bi-polar configuration. EED also involves the preferential transport of ions through ion exchange membranes, under the influence of a DC electrical field, producing concentrated acids/bases and salt-depleted water. Relevant Forward Osmosis-Electro-electrodialysis (FO-EED) technology is described more fully in patent application Ser. No. 15/665,732, filed Aug. 1, 2017.

The present invention takes advantage of power generation from low-temperature heat by hydro-osmotic processes. Relevant waste heat power generation technology is described more fully in Non-Provisional patent application Ser. No. 15/675,663, filed Aug. 11, 2017, the entire contents of which is incorporated herein by reference. The present invention also takes advantage of power storage using forward osmosis technology, which is described more fully in Non-Provisional patent application Ser. No. 15/784,700 filed Oct. 16, 2017, the entire contents of which is incorporated herein by reference.

The present invention embodiments take advantage of the very low energy requirements of a forward osmosis system for water desalination or purification, combined with a FO-EED system with improved high-conductivity membranes, for production of fresh water and regeneration of the draw solution for the forward osmosis cycle. If an EED process is supplemented downstream to a forward osmosis (FO) process, the energy consumption of EED remains within manageable levels, given that the desalination is primarily effected by the FO membranes and the electrolyte still retains sufficient electrochemical conductivity for movement of ions, without inordinate resistance or concentration polarization effects. In addition, the problem of membrane fouling or resin fouling is alleviated, given that only the diluted draw solution is fed to the EED process, without organics, calcium and magnesium carbonates/bicarbonates, and other fouling contaminants in the feed to the EED. The end result is a very low volume of concentrated brine (~25%) as the effluent, ideal for re-use as the draw solution concentrate for the upstream FO process. and with almost 70-75% of the incoming permeate from the FO process, as the diluted draw solution, converted to water treated to environmentally useable levels. Any ionized salt which gives a high osmotic potential in its solution in water, can be used as the draw solution for the forward osmosis process. Examples of preferred salts include ammonium chloride, magnesium chloride, ammonium bicarbonate or ammonium carbonate. A 20% solution of $MgCl_2$ yields an osmotic pressure of almost 300 atms, as compared to 168.54 atms for an equivalent concentration of NaCl. Similarly, ammonium chloride solutions have even higher osmotic potentials, and would be very suitable draw agents for the FO process, while also retaining high electrochemical conductivity for a downstream separation process, such as a FO-EED process. Forward osmosis, using for example ionic salts as the draw solute, enables substantially pure water-salt solutions to be sent down-stream to the EED process, which alleviates membrane fouling and associated maintenance issues in the EED system. Thus, the EED process works at close to ideal efficiency.

The EED process also includes anionic and cationic exchange resins in the main electrode compartments, in addition to the anionic and cationic membranes lining the periphery of the cells. As the salts ions are transported across the respective membranes, typically at a voltage of around 0.4-0.6 V/cell, the conductivity of the solution decreases, leading to higher amperage needs and corresponding resistance effects. Operating the cell at a higher voltage, around 0.8 V/cell, allows water to break down into H+ and OH− ions, which interact with the ion exchange resins in the cell, and restore ionic conductivity in the solution. The applied voltage is insufficient to electrolyze water into hydrogen and oxygen gases, which would ideally require voltages in excess of 1.23 VDC. Thus, the resins acts as a ionic pathway across each individual cell, keeping cell amperage and resistance low. Commercially available solid polymer membranes do not have sufficient electrochemical conductivity for efficiently deionizing large amounts of salt without a substantial energy penalty. New membranes with electrochemical conductivity higher by a hundred-fold are described herein. Such membranes, suitable for deionization of the ionic FO permeate to pure water and regeneration of a concentrated ionic FO draw solution, are described herewith. Porous gelled liquid electrolyte membranes have properties intermediate between liquid electrolytes and solids-state electrolyte membranes. These membranes have interconnected pores, filled with the desired electrolyte, which is held inside the pores by capillary forces. The pores are typically between 1-10 microns, and the porous polymer gel may have a porosity between 85-90%, which can then be filled with the desired liquid electrolyte by absorption. The polymers typically used for forming the porous membrane structures are well-known in literature, and range from polyethylene oxide (PEO), polyacrylonitrile (PAN), polydimethylsiloxane (PDMS), polyvinylidene difluoride (PVDF), poly(methyl-methlyacrylate) (PMMA) and other polymers. Some membranes cited in literature are also made from mixtures of these polymers with each other and other polymers. Thus, a few examples of porous membrane structures suitable for gelled electrolyte membranes are PVDF-HFP (PVDF-co-hexafluoropropylene) membranes, PDMS-PAN-PEO membranes, PVDF-NMP-EC-PC (PVDF with n-methylpyrilodine and ethylene and propylene carbonate) and even PVDF on glass mats. Such porous membranes, in which saturated solutions of $MgCl_2$ or $NH_4Cl$ have been absorbed, would have much higher electrochemical conductivity than conventional solid-state membranes.

If the draw solution to be used for the FO process is $MgCl_2$, as described in co-pending U.S. patent application Ser. No. 15/153,688, filed May 12, 2016, a porous gelled electrolyte membrane filled with saturated $MgCl_2$ solution can be used for both the anionic and the cationic sides in the FO-EED process, instead of conventional anionic or cationic solid membranes. Given that the gelled $MgCl_2$ cationic membrane is now used for transport of Mg+ ions across the membrane in the FO-EED system, and the gelled $MgCl_2$ anionic membrane is used for transport of chloride ions across the membrane in the FO-EED system, the transport efficiency of these ions across their respective membranes are optimized. Such gelled polymer electrolyte membranes function as salt bridges with electrodes of suitable polarity attached to them to either enable anion or cation transport. No new species are introduced into the system, and no other electrochemical or ionic interference effects takes place, given that all the cells in the FO-EED system contain the same ionic species, though in different concentrations. The exact impedance matching of these gelled polymer electrolyte membranes, if made by a procedure as described above, enables the minimization of polarization losses in the experimental cell. The anode and cathode materials are platinized titanium meshes, in order to resist salt and chloride corrosion.

Other osmotic solutions can also be used for operation of the FO-EED process, as described in co-pending U.S. patent application Ser. No. 15/153,688, filed May 12, 2016. Some are organic solutions of specially engineered polyethyelene glycols in water, exhibiting high osmotic potentials, and have the property of solubility inversion at certain temperatures or by injection of $CO_2$ gas. Thus, these organic solutes exhibit hydrophobicity and, thus, fall out of solution from their water mixtures. A two-phase mixture results, one draw solute-rich and the other water-rich.

The FO-EED process can make use of these novel organic, hydrophilic-lypophilic, specifically engineered oligomers, capable of high osmotic pressures in aqueous solutions and, thus, able to extract water from saline waters with high recovery rates. The regeneration of these 'osmotic agents' is effected by the phase separation of these agents from their aqueous solutions with injection of $CO_2$ gas. The $CO_2$ gas is subsequently desorbed by increasing the temperature of the polymer. Utilization of solar-thermal systems can effectively enable the temperatures of the solute-$CO_2$ mixtures to be raised above their $CO_2$ desorption temperature, thus, enabling regeneration of the concentrated solutes for recycling to the FO-EED step, as well as recovering the $CO_2$ gas for re-injection to the process.

A great quantity of energy can be potentially obtained when waters of different salinities are mixed together. The harnessing of this energy for conversion into power can be accomplished by means of Forward Osmosis, which can be configured as a Pressure Retarded Forward Osmosis (PRFO) system, a Pressure Assisted Forward Osmosis (PAFO) system, or a Pressure Equalized Forward Osmosis (PEFO) system. Embodiments of the invention described herein include a PRFO system, but other forward osmosis systems could be used. Pressure retarded forward osmosis uses a semi-permeable membrane to separate a less concentrated solution, or solvent, (for example, fresh water) from a more concentrated and pressurized solution (for example seawater), allowing the solvent to pass to the concentrated solution side. The additional volume increases the pressure on the permeate side, which can be depressurized by a hydro-turbine to produce power—thus the term 'osmotic power'.

The concept of harvesting the energy generated from mixing waters of different salinities was first reported by Pattle, and then re-investigated in the mid 1970s. With recent advances in membrane technology, there has been a reduction in membrane prices, rendering PRFO more economically viable. Encouraged by new research findings, Statkraft, Norway opened the world's first PRFO power plant prototype in November 2009 in Norway, at a site where river water flows into the North Sea, giving the required salinity and osmotic differential against seawater. This prototype has proved that the PRFO concept can be used to generate electricity. The plant was used to test different types of membranes and plant configurations and has been a key factor in the investigation of osmotic power. Despite membrane, hydraulic and generator inefficiencies, it was discovered that approximately 1 MW of power could be generated per cubic meter of river water flow per second into the ocean.

Examples of embodiments of the present inventive energy generation and storage technology are shown in FIG. 1, using both ionic osmotic solutions and polymeric (e.g., $CO_2$-philic) osmotic draw solutions. Referring to FIG. 1, the use of ionic osmotic draw solutions in an FO system, for example a Pressure Retarded Forward Osmosis (PRFO) system, is shown, integrated with a FO-EED system, for storage of renewable electrical energy from solar photovoltaics or wind energy, and generation of power using hydro-turbines as needed by utilities, and commercial and industrial consumers. The use of polymeric (e.g., amine-terminated polyethylene glycols) osmotic solutions is contemplated for the embodiments discussed herein, integrated with solar-thermal systems, to store renewable thermal energy, and generate power as needed by utilities, and commercial and industrial consumers.

Using commercially available carbon nanotube FO membranes from Porifera, for example, a PFO-9S system has a membrane surface area of 67 $m^2$. For a feed concentration of 1M NaCl (osmotic potential of 48 atm) against pure water, the flux rate of water across the membrane was measured at 33 liters/$m^2$/hr (LMH). For a 25% $MgCl_2$ solution (osmotic potential of 400 atm, 2.6M solution of $MgCl_2$) against fresh water, a flux rate in excess of 150 LMH is feasible. Thus, across the PFO-9S membrane, the total water flux would be around 10,050 liters/hr, or 2,655 gallons/hr. This equates to 44.25 GPM. The equivalent head for an osmotic potential of 400 atm is 12,842 feet of water. Computing the power rating of such a system, a water flux of 44.25 GPM and an osmotic differential of 400 atm, the power rating of a PRFO system is equivalent to 107 KW [P(KW)=44.25*12,842/5310=107 KW].

The PFO-9S membrane is available at a retail cost of $25,000, and assuming a balance of plant cost (including the FO-EED system, storage tanks and the hydro-turbines) of $125,000, we have a total cost of $150,000 for a 100 KW, with a capacity of sufficient energy storage for an 18-hour generation system (using approximately 60,000 gallons of water and concentrated draw solutions). Thus, the cost of storage is $150,000 for 1,800 kWh, i.e., $83.33/kWh. Assuming a 10-year life for the system (3650 cycles), the life-cycle cost of storage ($/kWh/cycle) computes to $0.0228/kWh/cycle. In comparison, for lithium-ion batteries (LIBs), the life-cycle cost of storage for a 10-year period is as follows: in the case of a LIB system specifying 6.4 kWh for $3,000, we have $468.75/kWh of storage capacity; in the case of a LIB system at $1,600, for 2.2 kWh it is $727.27/kWh of storage capacity. The LIB system commonly has a 10-year warranty, i.e. a full warranty for 3,650 Full Depth of Discharge cycles (once a day for 10 years), with zero capacity fade. For these above examples of LIBs, the Cost/kWh/Cycle computes to: $468.75 kWh/3,650 cycles=$0.1284/kWh/cycle; and $727.27 kWh/3.650 cycles=$0.1992/kWh/cycle. Thus, embodiments of the present invention can provide economic benefits for renewal energy storage.

Referring to FIG. 1, one embodiment of a hybrid electrical-thermal energy generation and storage system 10 is shown comprising an FO module 12, a hydro-turbine 14, an optional diluted draw solution storage tank 16, and FO-EED module 18 powered by a solar photo-voltaic cell 20 or grid-based rectifier, a coalescer (gas-liquid mixer) 24, a source of heat 26 (e.g., waste heat or solar thermal energy), a $CO_2$ desorber 28, a cooling tower 30, an optional polymer storage tank 34, a $CO_2$ compressor 38, an optional water storage vessel 42, and an optional ionic solution storage vessel 44. The FO module 12 comprises an FO membrane 46, and may be a PRFO module, a PAFO module or a PEFO module, as discussed above.

In one application of the example embodiment of FIG. 1, water 50 is directed into the FO module 12 along one side of the membrane 46, while an osmotic ionic solution 52 is directed into the FO module 12 along the other side of the membrane 46. The osmotic pressure of the ionic solution 52 draws the water 50 across the membrane 46 and exits the FO module 12 as diluted ionic solution 54, which can be directed into the hydro-turbine 14, generating energy. In one embodiment, the ionic solute comprises 25% $MgCl_2$. The diluted ionic solution 54 can be stored in the optional draw solution storage tank 16 before being directed into the FO-EED module 18, where the ionic solute can be separated from the water, as explained more fully in U.S. patent application Ser. No. 15/665,732, filed Aug. 1, 2017. The FO-EED module 18 produces a concentrated ionic solution 52, which can be stored in the optional ionic solution storage vessel 44 before being directed into the FO module 12 for hydro-osmotic power generation.

The FO-EED module 18 also produces a water polymer mixture 56, which can be directed into the coalescer (gas-liquid mixer) 24, which separates water from the polymer through the use of injected $CO_2$ 60. Exiting the coalescer (gas-liquid mixer) 24 is a combination of polymer and absorbed $CO_2$ 62, which is then directed into the heat source 26. The heated combination of desorbed $CO_2$ and polymer 64 is then directed into the $CO_2$ desorber 28, where the $CO_2$ is separated from the polymer. The desorbed $CO_2$ 68 is then joined with any unabsorbed $CO_2$ 70 that was not absorbed in the coalescer (gas-liquid mixer) 24 and directed into the $CO_2$ compressor 38, where the compressed $CO_2$ 60 can then be stored or simply directly injected back into the coalescer (gas-liquid mixer) 24. In the meantime, the polymer 72 separated from the $CO_2$ is then preferably directed into the cooling tower 30, then into the optional polymer storage tank 34 before being redirected into the FO-EED module 18. The use of heat, including waste heat, to drive the separation of polymer from $CO_2$ is described more fully in Non-Provisional patent application Ser. No. 15/272,406, filed Sep. 21, 2016 and Non-Provisional patent application Ser. No. 15/675,663, filed Aug. 11, 2017, the entire contents of both of which are incorporated herein by reference. In one embodiment, the ionic solution, the water and the polymer are directed through the system using low pressure pumps, although optimization of the system may lead to differences as desired by the user.

Energy Generation:

When energy generation is needed, during periods of high-cost energy or when no solar insolation is available, the regenerated/concentrated 25% $MgCl_2$ (2.6M) solution (osmotic potential ≈400 atm) is pumped through the draw side of a PRFO/PAFO/PEFO membrane system, while the stored fresh water is routed through a low-pressure pump to the feed side of the FO membrane. The high difference in osmotic potentials between these two streams across the FO membrane, assisted by positive hydraulic pressure from the LP pumps, enables large volumes of water at high flux rates (≈50-150 LMH) to permeate across the membrane, leading to high hydraulic pressures, which in turn is routed through a hydro-turbine, which can be used to produce power as needed.

Energy Storage:

During periods of renewable electrical energy generation (or low-cost grid power availability), a diluted draw solution of an ionic salt (e.g. $MgCl_2$) is routed from a storage tank to a specially engineered FO-EED system (high-permeability FO hollow-fiber membranes and ion-exchange membranes with very high conductivities (≥10× commercial solid-state membranes), wherein the electricity produced from the renewable energy source (solar PV) is used to re-concentrate the ionic salt solution to concentrations greater than 25% (equivalent to osmotic potentials of 400 atms), with electrochemical energy from solar PV (or grid-based inverters). Simultaneously, in the FO-EED system, the majority of water is separated from the incoming diluted ionic draw solution by using concentrated polymeric draw solutions. The now-concentrated ionic draw solute stream is stored in a separate tank for subsequent use in the energy generation cycle.

The diluted polymeric draw solution is further routed to a $CO_2$ injection gas-liquid coalescer and a solar-thermal (or waste heat) concentration system. During concurrent periods of solar thermal energy generation (or from a waste heat source), the diluted solution of the polymers from the FO-EED system is routed to a gas-liquid coalescer, wherein $CO_2$ gas is introduced into the diluted polymeric solution. Absorption of $CO_2$ by the polymer causes the polymer to completely phase-separate from water. The $CO_2$-rich polymer liquid is routed to a solar-thermal (or waste heat) heat source, wherein the $CO_2$ is desorbed at temperatures around 75-80° C., and the polymer regenerated as a concentrated polymeric solution with high water absorption capacity. Simultaneously, the fresh water separated from the diluted polymeric draw solution is filtered and stored in a tank for subsequent use in the energy generation cycle.

The described invention thus enables storage of both renewable electrical energy, in concentrated ionic draw solutes, and renewable thermal energy, in concentrated polymeric draw solutes. One embodiment of the invention enables both solar electrical and solar thermal energy to be stored. Another embodiment of the invention enables excess electrical generation capacity and waste heat to be stored for power generation during periods of need.

The techno-economics of the two cycles are discussed below. Calculation assumptions: solar insolation/low-cost grid-based energy available for 8 hours per day, and energy production from energy storage system for 16 hours per day, during periods of high-cost grid-power or no/low solar insolation.

Energy Generation Cycle:

Assuming 1,330 gallons of 25% $MgCl_2$ solution, with an osmotic pressure of 400 atms, the ionic osmotic fluid should be able to pull 41,150 gallons of fresh water through the FO membrane, at an LMH of 150. [Dilution of $MgCl_2$ from permeated water across the membrane: 1330 gallons @400 atm=2,660 gallons @200 atms=5,320 gallons @100 atms=10,640 gallons @50 atms=21,280 gallons @25 atms=42,560 gallons @12.5 atms. Ionic draw solute diluted from 25% to 0.78125%]. Total amount of water pulled across the membrane=41,150 gallons in 16 hours. Since fresh water, at 50 psig 3 atm) hydraulic pressure, is used as the feed, no concentration polarizations effects happen, which would have caused lowered flux rates. The PAFC mode helps in maintaining high flux rates. Total liquid volume flow across the hydro-turbine=42,560 gallons in 16 hrs=44.33 GPM for 16 hours of energy generation. Osmotic pressure differential: 403-1=402 atms.=402*32.04=12,880 ft (static head) of water (assuming a trans-membrane pressure drop of 12.5 psig ≈1 atm). The equation for ideal hydro-dynamic calculations, at 100% efficiency, for the power of a hydro-turbine is: P=Q*H/k (where P=power in KW, Q=flow rate in GPM, H=static head in feet, and k=5,310 gal·ft/min·kW). Thus, using the above equation, P (KW)=GPM*Head(ft)/5310=44.33*12,880/5310=107.53 KW. At an assumed 50% efficiency of the hydro-turbines (high-flow turbines), available power=53.765 KW. Assuming a parasitic load of 5.0 KW for the low-pressure pumps, available power=48.765 KW, after taking into consideration the energy consumed by the LP pumps. Energy produced=780 KWH over a period of 16 hours.

Energy Storage Cycle:

Energy consumed for regeneration of a 25% $MgCl_2$ solution from the diluted (0.78125% $MgCl_2$) solution at 600 VDC and 13.2 amps for 8 hours=63.36 kWh ea, for 2 systems. (Reported in Evoqua literature for a 27.5 GPM CEDI system with IonPure membranes—the Nrgtek system is calculated to be around 22.125 GPM flux rates across 2 modified FO-EED systems for efficient separation and concentration of the ionic draw solution, using higher ionic conductivity AEX and CEX membranes (1-3 S/cm), both of which should lower energy consumption).

Assuming 75% efficiency for the FO-EED system for regeneration of the ionic osmotic solute, electrical energy needs from the solar PV system=168.96 kWh. Heating 1,330 gallons (5,034.45 liters) of solvent (after $CO_2$-induced phase separation from water), with a specific heat of 0.88 kcal/l, from a temperature of 25° C. to 85° C. (for $CO_2$ desorption), heat required=5034.45*0.88*60=265,818.9 kcal=328.95 kWh. Assuming 75% thermal efficiency for the waste heat or solar thermal system, needed heat energy (solar-thermal or waste heat) in kWh=438.60 kWh for $CO_2$ desorption. Total volume of $CO_2$ needed @ 250 mg $CO_2$/ml solvent=1,006.9 $m^3$ of $CO_2$ at atmospheric pressure, to be compressed to 50-100 psig (125.86 $Nm^3$/hr or 84.33 SCFM, over 8 hours). Assuming a 30 KW $CO_2$ compressor, operated over 8 hours, energy consumed=240 kWh. Total energy supplied during the storage mode=168.96+438.60+240=847.56 kWh. Round-trip efficiency: Energy produced in 16 hours/energy stored in 8 hours=780/847.56=92%.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A renewable or conventional energy generation and storage system, the system comprising:
    a forward osmosis system for drawing water across a membrane such that, when in use, the water drawn across the membrane is used to dilute an osmotic concentrated ionic draw solution and the increased volume of the diluted osmotic draw solution is used to drive a hydro-turbine to produce energy;
    a hydro-turbine driven by the diluted ionic draw solution when in use;
    an FO-EED separation system for separating the drawn water from the ionic draw solution using renewable electrical energy and an osmotic polymer introduced in the FO-EED system during use, so that the ionic draw solution can be re-directed to the forward osmosis system and the water combined with the introduced polymer for further processing during use; and
    a coalescer configured to receive compressed $CO_2$ to separate the water from the polymer by having the polymer absorb the compressed $CO_2$ during use.

2. The renewable or conventional energy generation and storage system of claim 1, further comprising a source of heat to facilitate separation of the $CO_2$ from the polymer.

3. The renewable or conventional energy generation and storage system of claim 1, wherein the draw solution comprises one or more ionic osmotic solutions.

4. The renewable or conventional energy generation and storage system of claim 3, wherein the ionic osmotic solution comprises magnesium chloride and/or ammonia chloride.

5. The renewable or conventional energy generation and storage system of claim 1, wherein the osmotic polymer comprises one or more amine-terminated branched polyethylene glycols.

6. The renewable or conventional energy generation and storage system of claim 1, wherein power from solar photovoltaic or wind turbines, or excess power generation from conventional energy sources, is used to supply electrical energy for the FO-EED system.

7. The renewable or conventional energy generation and storage system of claim 2, wherein the source of heat comprises solar thermal heat, or waste heat from industrial processes.

8. A method of generating and storing renewable energy, the method comprising:
    drawing water across a forward osmosis membrane in a forward osmosis system such that the water drawn across the membrane dilutes an osmotic ionic draw solution;
    directing the diluted osmotic ionic draw solution to drive a hydro-turbine to produce energy;
    separating the water from the ionic draw solution using an osmotic polymer so that the ionic draw solution can be re-directed to the forward osmosis system and the resulting combined water and polymer can be further processed; and
    separating the osmotic polymer from the water using compressed $CO_2$.

9. The method of generating and storing renewable electrical energy of claim 8, wherein separating the water from the draw solution comprises directing the diluted draw solution into an FO-EED module.

10. The method of generating and storing renewable thermal energy of claim 8, further comprising heating the combination of polymer and $CO_2$ to facilitate separation of the $CO_2$ from the polymer.

11. The method of generating and storing renewable electrical energy of claim 8, wherein the draw solution comprises one or more ionic osmotic solutions.

12. The method of generating and storing renewable electrical energy of claim 11, wherein the draw solution comprises magnesium chloride and/or ammonia chloride.

13. The method of generating and storing renewable thermal energy of claim 8, wherein the osmotic polymer comprises one or more amine-terminated branched polyethylene glycols.

14. The method of generating and storing renewable thermal energy of claim 10, wherein heating comprises directing the combination of polymer and $CO_2$ through a solar thermal heat exchanger.

* * * * *